Jan. 26, 1926.
J. T. HELBERT
1,570,833
FISHING TOOL FOR WELLS
Filed August 17, 1923
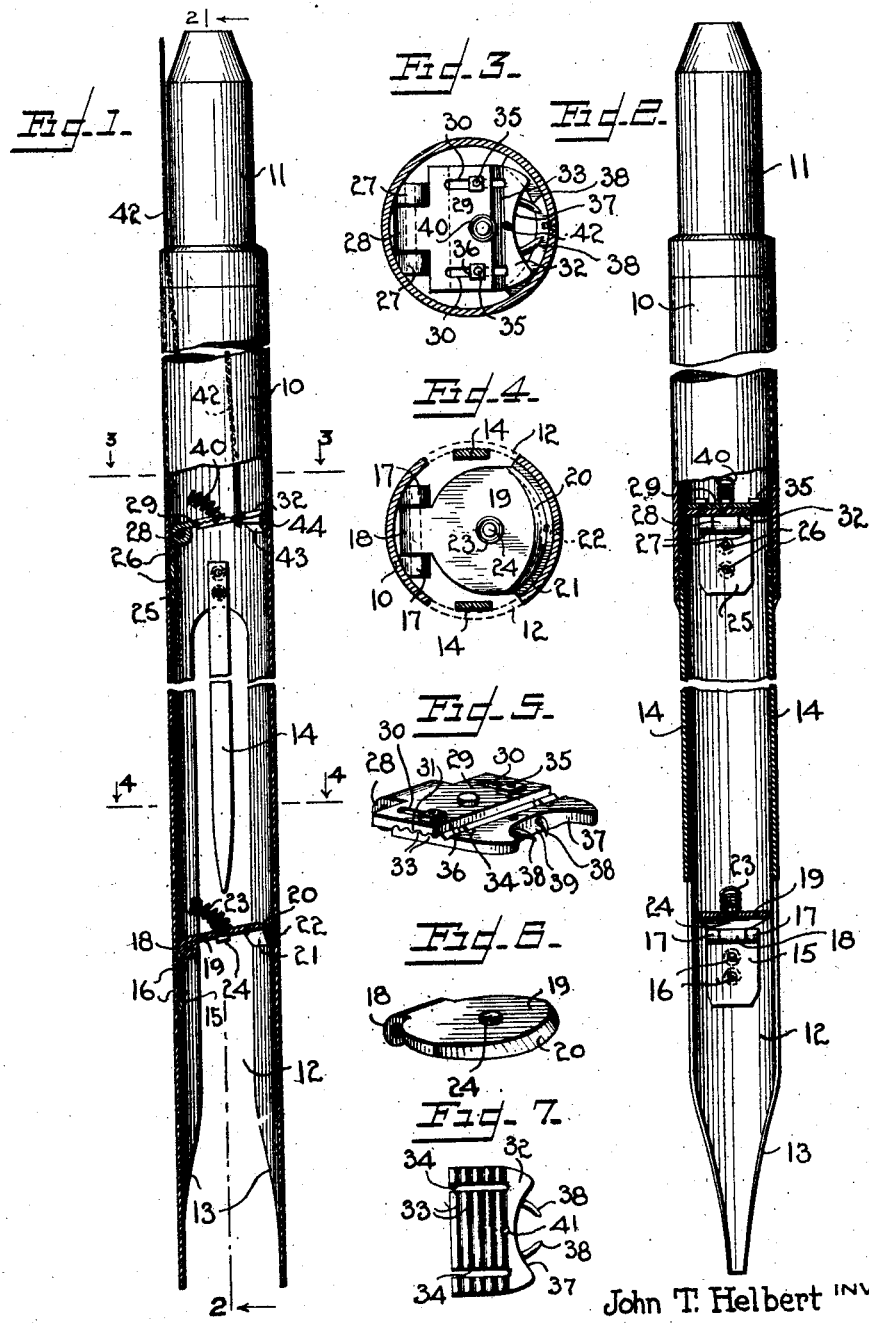
John T. Helbert INVENTOR Patented Jan. 26, 1926.

1,570,833

UNITED STATES PATENT OFFICE.

JOHN T. HELBERT, OF BROADWAY, VIRGINIA.

FISHING TOOL FOR WELLS.

Application filed August 17, 1923. Serial No. 657,892.

*To all whom it may concern:*

Be it known that I, JOHN T. HELBERT, a citizen of the United States, residing at Broadway, in the county of Rockingham and State of Virginia, have invented a new and useful Fishing Tool for Wells, of which the following is a specification.

This invention relates to fishing tools for use in wells for the purpose of catching or grabbing a broken off drilling cable to effect removal thereof, together with the tools carried thereby.

In drilling wells, it frequently happens that the drilling cable breaks off, often at a great distance below the surface of the ground. It then becomes necessary to remove the broken cable with the tools. Devices have been proposed for this purpose, but the great objection to such devices as proposed is that in case the broken end of the cable is frayed or frazzled, a firm grip cannot be obtained without first trimming the end clean. It is with these facts in view that I have designed the present device, which includes means for initially cutting off the frayed end of the cable, so that it may be subsequently gripped by a clutch member embodied in my device, it being intended that the cutting tool be used first and separately, and then removed when the clutch member is placed in operative position.

An important object is the provision of a grab device of this character, in which the clutch member is adjustable to exert a firm gripping action upon cables of different sizes.

A further object is the provision of a grab structure of this character in which the body is longitudinally slotted to provide a certain degree of resilience, and in which the slots are partially enclosed by guards which will operate to prevent the frayed end of the rope from working between the body of the structure and the well casing, and jamming.

To the attainment of the foregoing objects and advantages, the invention consists in the details of construction and arrangement to be hereinafter described and claimed, and illustrated in the drawings, although it should be understood that the present form is merely an exemplification of a preferred embodiment, and that various changes and modifications may be resorted to, as may be found advantageous, in increasing the adaptability and utility of the device, provided that such variations constitute no departure from the salient features of the invention or the scope of the appended claims.

In the drawings, wherein similar reference characters designate corresponding parts in the several views:—

Fig. 1 is a side elevation of the device, with parts in section.

Fig. 2 is a similar view taken at right angles to Fig. 1, the line of section being indicated by the line 2—2 of Fig. 1.

Fig. 3 is a cross section on the line 3—3 of Fig. 1.

Fig. 4 is a similar view on the line 4—4 of Fig. 1.

Fig. 5 is a detail perspective view of the clutch member.

Fig. 6 is a detail perspective view of the cutting member.

Fig. 7 is a bottom plan view of the main plate of the clutch member.

Referring more particularly to the drawings, I have shown the body of the device as comprising a cylindrical tubular body member 10, which has its upper end somewhat reduced, as indicated at 11, and capable of being suspended by the usual means, whereby it may be lowered into the well from which the drilling cable and tools are to be removed. This member is usually constructed eight feet long. For a considerable portion of its length, the opposite sides of the body are slotted, as shown at 12, to provide a certain degree of resilience, and the ends between the slots are preferably somewhat tapered at their opposite sides, as indicated at 13. In order to prevent the frazzled end of a broken-off cable from working between the body member 10 and the well casing, I provide guards which are in the nature of resilient strips 14 secured upon the inner periphery of the body at the top of the slots and extending part way along the slots 12, nearly to the cutting member.

The cutting member comprises an attaching plate 15 secured against the inside of the body by means of removable screws 16, and formed with knuckles 17, between which is pivoted an ear 18 on a disk 19, having a cutting edge 20 cooperating with the inner upper edge of a ledge or plate 21 held detachably in place in the body by a screw 22. This disk carries a coil spring 23 of curved shape having one end secured to the disk by a bolt 24, and having its other end engageable with the side of the body to prevent the disk from remaining in upright position at any time, but keeping it in the lowered position.

The grab structure or clutch member comprises an attaching plate 25 detachably secured to the inner periphery of the body above the slots 12, by means of screws 26, and formed with knuckles 27, between which is pivoted an ear 28 formed on a top plate 29, which is provided with spaced slots 30, and which has its under surface formed with corrugations 31. Associated with the top plate 29 is a bottom plate 32 having its upper surface corrugated at 33, for cooperation with the corrugations 31, and formed with slots 34 registering with the slots 30 to a greater or less extent, and through which pass clamping bolts 35 carrying nuts 36, by means of which the position of the bottom plate 32 with respect to the top plate 29 may be varied for gripping cables of different sizes, the free edge or end of the bottom plate 32 being cut away along a curve, as shown at 37, for more or less conforming engagement with the cable. This curved edge is provided with converging downwardly inclined prongs 38, which will penetratingly engage the cable for positively preventing slipping thereof. These prongs engage the rope without any tendency to untwist or unravel the rope. It is preferable that this curved edge 37 be widened by the provision of a reinforcing web 39 on the underside of the bottom plate 32, this detail being visible in Fig. 5. It should also be stated that the plate 29 has connected therewith one end of a curved coil spring 40, similar to the spring 23 and for the same purpose. The bottom plate 32 is provided near the curved cut away portion 37 with a hole 41, through which is passed the knotted end of a flexible wire or rope 42, which extends upwardly through the body 10, out through the shoulder defined by the juncture of the reduced extension 11 therewith, and then along the reduced extension 11, this flexible member extending, of course, to the top of the well, in which the device is used, and being for a purpose to be described. Cooperating with the clutch device is a curved ledge 43 against which the free end of the plate 32 engages, and this ledge is held in the body 10 by a removable screw 44.

In the operation of the device, the clutch member comprised by the parts 26 to 44, inclusive, is not placed in position, while the cutting member comprised by the parts 16 to 24 is mounted within the device, the screws 16 and 22 holding the parts in place. With the cutting member in position, and assuming that the cable has broken, the entire tool is lowered into the well until it reaches a sufficient depth that the frazzled or frayed upper end of the broken off cable will be received within the lower end of the device. As this end of the cable enters the body 10, it will move the disk 19 upwardly. After a sufficient amount of the cable has entered, then an upward pull or quick movement is given to the tool, by means of whatever suspension device is used in connection with it, wherefore the cable will be cramped between the sharp upper edge of the ledge 21, and the cutting edge 20 of the disk 19, and as the weight of the cable and drilling tool suspended therefrom comes upon these cutting edges it is quite obvious that the cable will be cut, the frazzled end remaining within the tool above the disk 19. The device is then pulled out of the well, the cut off end of the cable is removed, and the screws 16 and 22 are removed so that the cutting device may be taken out entirely.

In the second step of the operation, the clutch member or grab member is placed in position by inserting the parts in place, and screwing home the screws 26 and 44, the flexible member 42 being likewise placed in position, as illustrated. The tool is then again lowered into the well until the upper end of the cable passes up into the body 10 beyond the clutch member, the clutch member naturally swinging into non-obstructing relation as it engages the upper end of the cable, the swinging movement being limited by the spring 40. When the tool has been lowered to a sufficient extent and the upper end of the cable has reached a point somewhat above the clutch member, an upward pull is exerted upon the tool, whereupon the clutch member will swing downwardly, the curved edge 37 cramping the cable against the ledge 43, and the prongs 38 penetratingly engaging the cable to prevent slipping. When the upward pull on the tool is continued, it is quite clear that the cable and drilling tools will be carried along with it, so that removal thereof from the well will be readily effected.

In case of any jamming which prevents this lifting action, a pull upon the flexible member 42 will swing the clutch member upwardly and release it from engagement with the cable, and then by holding onto the the member 42 and lifting the tool, the latter may be withdrawn from the well leaving the rope in the well.

In some instances, it may even be necessary to cut away the entire cable step by step until the drilling tools carried thereby are reached so that they may be removed by any of the well known types of grapplers provided for the purpose. My device operates equally well when this is necessary, the clutch member being unnecessary for this operation and the cutting disk and its mounting alone being used.

What is claimed is:—

1. In a device of the character described, an elongated hollow body, a stationary curved plate therein, a swingable clutch member on the inside of the body and adapted to clamp a cable between the edge of said member and said plate, said member having its free edge curved and provided with prongs which converge and extend downwardly to obviate untwisting or unraveling while it is being pulled out.

2. A fishing tool comprising a hollow casing having a longitudinally slotted lower end to provide a resilient cable receiving portion, resilient guard strips on the casing in the longitudinal slots to prevent the frazzled end of a cable from working out of the casing and jamming the tool, and a clutch device in the casing above said slots.

In testimony that I claim the foregoing as my own, I have hereto affixed my signature.

JOHN T. HELBERT.